Nov. 18, 1941.  L. HABERT  2,263,493
APPARATUS FOR MANUFACTURING GLASS SHEETS
Filed March 17, 1937
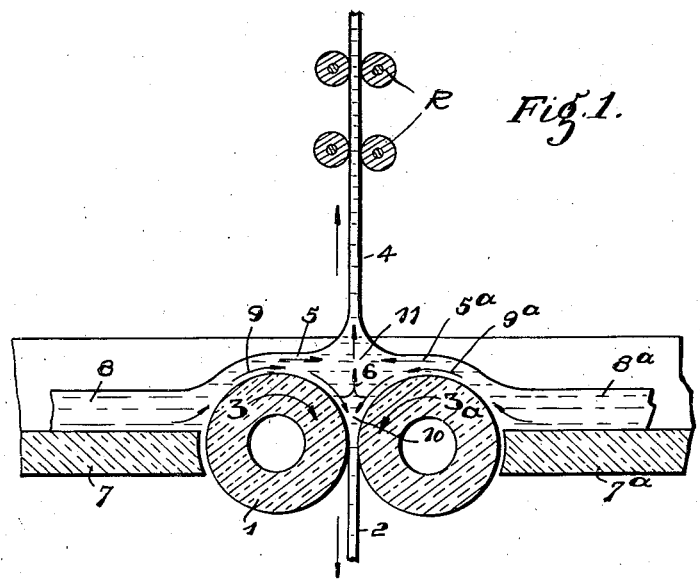
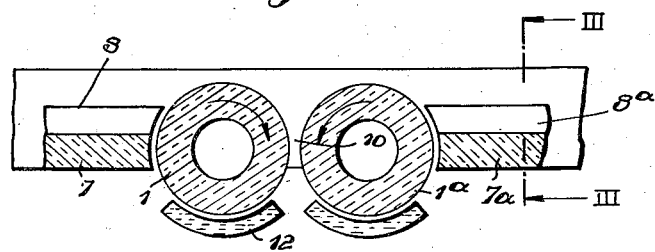
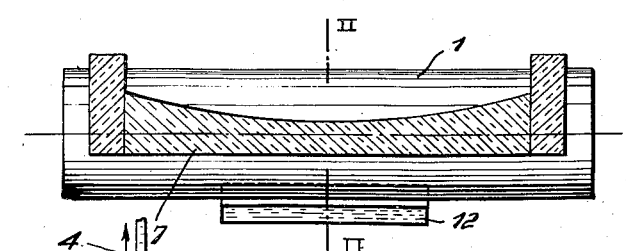
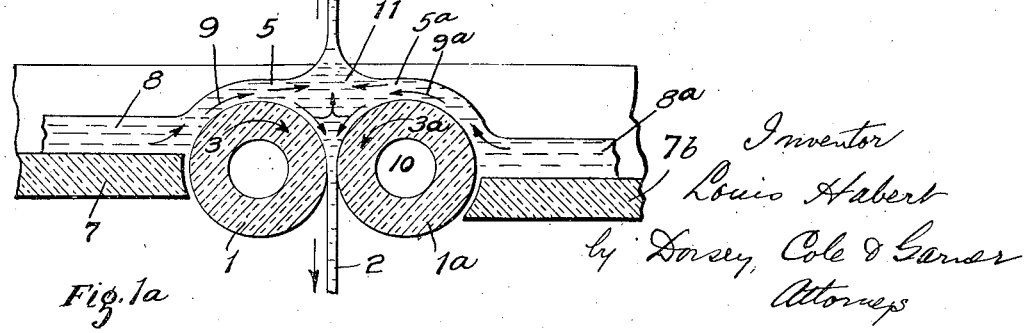
Inventor
Louis Habert
by Dorsey, Cole & Garner
Attorneys Patented Nov. 18, 1941

2,263,493

UNITED STATES PATENT OFFICE 2,263,493

APPARATUS FOR MANUFACTURING GLASS SHEETS

Louis Habert, Paris, France, assignor to Societe Anonyme des Manufactures des Glaces & Produits Chimiques de Saint-Gobain, Chauny & Cirey, Paris, France Application March 17, 1937, Serial No. 131,502
In France March 23, 1936

2 Claims. (Cl. 49—17)

The present invention relates to apparatus for manufacturing glass sheets by drawing.

The object of this invention is to provide apparatus which permits of eliminating the drawbacks of methods and apparatus used up to this time.

A first feature of the invention consists in drawing the glass sheet from the mass of glass set in motion by means of moving organs such as for example cylinders, only a portion of said organs being in contact with said mass of glass.

Another feature of the invention consists in drawing the glass sheet from the mass of glass located in the immediate vicinity of the slot of a rolling machine.

Still another feature of the present invention consists in creating in the mass of glass from which the glass sheet is drawn, currents of a direction and intensity such that they tend, by themselves to give the glass sheet an even thickness and a good plainness. Furthermore, as it is possible, according to the invention, to modify at will these currents without it being necessary to vary the rate of drawing or the temperature of the glass mass, the thickness of the sheet of glass can be readily adjusted to a given value. It is also possible, according to the present invention, to vary these currents in a particular manner for certain points or certain areas of the drawn sheet, which permits of correcting from place to place irregularities in the thickness or the plainness as might occur, for some reason, in the glass sheet that is drawn.

Other features of the present invention will result from the following detailed description of some specific embodiments thereof.

Preferred embodiments of the present invention will be hereinafter described, with reference to the accompanying drawing, given merely by way of example, and in which:

Fig. 1 is a sectional view, in a plane at right angles to the plane of drawing of the glass sheet, of a device for carrying out the method according to the present invention;

Fig. 1a is a sectional view corresponding to Fig. 1, illustrating a modified embodiment of the invention;

Fig. 2 is a sectional view, on the line 2—2 of Fig. 3, of a modification of the device shown by Fig. 1;

Fig. 3 is a sectional view, on the line 3—3 of Fig. 2, of the same device.

The device shown by Fig. 1 includes rollers 1 and 1a which are not wholly immersed in the mass of glass but which are arranged in the manner of rolling elements turning in the directions of arrows 3 and 3a, respectively so as to form a glass sheet 2 obtained by rolling and evacuated in a downward direction. For this purpose, the rollers, located sufficiently close to each other, are placed at the respective ends of two conduits 7 and 7a in communication with melting tanks, not shown in the drawing, the glass masses 8 and 8a being brought by said conduits into contact with the rollers.

According to the invention, a glass sheet 4 is drawn in an upward direction from the mass of glass 11 located close to the inlet of the rolling slot. The rotation of the rollers produces, in this mass, first surface currents 5—5a which create in the surface of the bath of glass, in the portion thereof equidistant from the rollers, a zone which facilitates the formation of a glass sheet by drawing. It follows that when the drawing of this sheet is started, in the usual manner, its base is maintained exactly along the axis of this zone and, furthermore, that the material forming the sheet is fed by the movements of the glass bath itself. The rotation of the rollers also produces, under certain conditions, an ascending current 6 which is also favorable to the formation of the drawn sheet.

This current 6 is due to the fact that the glass film which is in contact with rollers 1 and 1a congeals, adheres to said rollers and follows their movements. Because of the relative adhesion of the different layers with one another, due to the viscosity of glass, this film draws, together with it, a certain amount of the adjoining fluid mass. The quantity of glass that is thus drawn therefore depends, first upon its viscosity, that is to say upon the nature of the glass and its temperature, and especially the temperature of the layers adjacent to the rollers. Therefore it is possible to act upon the thickness of the glass layer that is driven by acting merely upon the temperature of the rollers. But the amount of glass that is thus drawn along by the rollers is also a function of the size of these rollers, their shape, the proportions of the arc of contact between the rollers and the glass of conduits 7 and 7a. It can therefore be varied by vertically modifying the position of the rollers with respect to the bottom of the conduits or by changing the height of the glass in the conduits, or by acting on both of these factors. The amount of glass that is drawn along is also a function of the speed of rotation of the rollers. Anyway, the influence of the movement of the rollers is propagated in the mass of glass to a rather considerable distance from said rollers. It follows that it is possible to give the layer of glass that is drawn toward slot 10, in the direction of arrows 9 and 9a, a relatively great thickness and that, anyway, this thickness can be brought to a rather high value and adjusted as desired.

On the other hand, the width of slot 10, that is to say the thickness of the rolled sheet 2 can be adjusted to a relatively low value. It is therefore possible to arrange things in such manner that the whole of the glass that is set in motion in the direction of arrows 9 and 9a toward slot 10 is not absorbed for producing the sheet of glass 2 and that an excess of glass is driven back toward the slot 10 and in opposition to the direction of the drawing. As a matter of fact, the base of the drawn sheet 4 is fed by this ascending current of fluid glass. Besides this current exists prior to the drawing operation and facilitates the starting thereof, at the beginning of the manufacture. During the drawing operation, this current still participates constantly in the formation of the sheet and influences the value of the thickness thereof.

As a rule, it is advantageous that the amount of glass drawn along by rollers 1 and 1a should correspond to the amounts of glass employed in the rolling and drawing operations. However, other adjustments can be considered, for instance by acting upon the speed of rotation of the rollers or their position, if it is desired to increase the importance of the surface currents with respect to the ascending current or inversely.

In the device shown by way of example in Fig. 1, I have considered the case of identical rollers, parallel to each other and horizontally disposed, both at the same level, these rollers being fed through identical conduits. I thus obtain an arrangement which is symmetrical with reference to the vertical plane passing through the middle of the interval or slot between the rollers, and this symmetry is advantageous for the drawing of a vertical sheet in this plane. But such conditions are not necessary according to the invention. In particular, I might carry out the invention by making use of rollers fed from a single conduit, in the same manner as in ordinary rolling machines, and by effecting the drawing out in the zone of the conduit that is close to the rollers.

Besides, even in the arrangement shown by Fig. 1, some of the parts can be made unsymmetrical. For instance, the bottom of one of the conduits 7 or 7a can be made at a lower level, as shown by the conduit 7b in Fig. 1a with a view to increasing for the corresponding roller the length of the arc of contact with the mass of glass and also the importance of the cooling action of said roller. It is possible to remedy through this means the differences of temperature that might exist between the glass of one of the conduits and that of the other. Another means for the same purpose consists in placing one of the rollers higher than the other, or in cooling to a greater degree one of the rollers than the other.

Analogous adjustments can be effected when the glass of the inlet conduits is not at the same temperature in all of its points along a transverse section of said conduits. In this case, the flow of the mass of glass may be different along the drawing zone and this might be detrimental to the regularity of the plainness or of the thickness. In order to obviate this defect, that is to say in order to restore the uniformity of the conditions of formation of the drawn sheet, I may adjust differently, according to the different points of the transverse section of the conduits or rollers, either the position of the bottom of the conduit, or the cooling of the rollers, or the diameter of said rollers. Figs. 2 and 3 show an example of such an arrangement, as applied to the case (which occurs frequently) in which the glass flowing along the edges of the conduits is not so hot as that flowing in the median part of said conduits. In this case, as shown by Fig. 3, the bottom of the feed conduits is raised near the edges in such manner that the rollers act for a longer time upon the glass of the median part and reestablish the uniformity of the currents and the temperature of the glass between the two rollers. This arrangement may be completed by means for cooling to a higher degree the rollers themselves in some of their parts. In Fig. 2 and Fig. 3, I have shown, by way of example, a cooling box 12 located in the region where the surface of the rollers is free. But any other means for acting upon the rollers so as to cool them can also be considered. In a like manner, I may also act directly upon the glass of the conduits, for instance by leaving certain portions uncovered and exposed to the action of the surrounding air, and covering other portions.

As it results from the above explanations, it is possible to adjust at will the temperature of glass in the very zone where the drawing operation is carried out, and the importance of the currents that are formed toward this zone, by acting upon the relative position of elements such as the rollers and the feed conduits, and upon the adjustment of the cooling of these members. These controlling means have the advantage of being located outside of the furnace proper and of being protected against the considerable heat thereof. They permit of varying within a wide range the conditions in which the glass mass is at the time of the drawing, and this variation is obtained without involving any necessity of modifying the conditions of glass in the furnace. Another advantage lies in the fact that these means are readily accessible and can easily be superintended.

It should be noted that when use is made of a device such as that shown by the drawing, the rolled sheet that is produced does not constitute the chief object of the manufacture. Of course, it is possible to obtain in this manner an industrial product such as an impressed or figured glass sheet or the like. But this rolled sheet may also be considered as a waste product, that is to say as a piece of glass intended to be crushed and again treated in the furnace. Besides, if it is intended that the upward current, that is to say current 6, should be as considerable as possible, the rolled sheet is naturally given a thickness as reduced as possible, so that said sheet corresponds as a rule to a relatively low quantity of glass.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the accompanying claims.

What I claim is:

1. An apparatus for the manufacture of a glass sheet by drawing which comprises in combination two cooperating horizontal rolling cylinders, with a passage between them, for forming a rolled glass sheet, one conduit for feeding glass to each of said rolling cylinders and located on each side of the pair of cylinders, said rolling cylinders projecting downwardly with respect to the outlets of said conduits so that their lower peripheries are not immersed in said mass of glass, means for forming a glass sheet by drawing glass upwardly from the portion of said mass of glass that is located between the upper parts of said rolling cylinders, above the rolling passage between said cylinders.

2. In an apparatus for the manufacture of glass sheets by drawing, comprising, in combination, two cooperating rolling members with a passage between them for forming a rolled glass sheet, a conduit located on each side of the said rolling members, said rolling members and said conduit being arranged in such manner that only a part of said members is covered by said mass of glass, means for forming a glass sheet by drawing glass from the portion of the mass of glass that is adjacent to the inlet of said rolling passage between said members, and means for cooling at least a portion of the periphery of said rolling members that is not immersed in said mass of glass.

LOUIS HABERT.